(12) United States Patent
Shoji et al.

(10) Patent No.: US 7,869,101 B2
(45) Date of Patent: Jan. 11, 2011

(54) IMAGE PROCESSING APPARATUS HAVING ENHANCED CONTROLLING PROCESS FOR OPTICAL SCANNING UNIT

(75) Inventors: Katsunori Shoji, Chigasaki (JP); Takeshi Yamakawa, Fujisawa (JP); Hiroshi Yoshizawa, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 1078 days.

(21) Appl. No.: 11/605,267

(22) Filed: Nov. 29, 2006

(65) Prior Publication Data

US 2007/0134023 A1 Jun. 14, 2007

(30) Foreign Application Priority Data

Nov. 30, 2005 (JP) .............................. 2005-346035

(51) Int. Cl.
H04N 1/04 (2006.01)
(52) U.S. Cl. .................... 358/474; 358/509; 358/475; 358/501; 359/198.1; 399/206; 347/241
(58) Field of Classification Search ................ 358/509, 358/475, 474, 442, 496, 497; 359/216, 196.1, 359/107, 212.1, 198.1; 399/206, 151; 347/241, 347/257, 242
See application file for complete search history.

(56) References Cited

U.S. PATENT DOCUMENTS

| | | | |
|---|---|---|---|
| 5,973,772 A * | 10/1999 | Fukuma et al. ............. 356/124 |
| 6,072,516 A | 6/2000 | Yamakawa | |
| 6,236,418 B1 | 5/2001 | Yamakawa | |
| 6,243,128 B1 | 6/2001 | Yamakawa | |
| 6,593,951 B2 | 7/2003 | Yokoyama | |
| 6,707,480 B2 * | 3/2004 | Ameyama et al. ........... 347/129 |
| 6,829,001 B2 | 12/2004 | Yamakawa | |
| 7,057,780 B2 | 6/2006 | Yoshizawa | |
| 7,352,377 B2 * | 4/2008 | Matsutomo ................. 347/136 |
| 2005/0012974 A1 | 1/2005 | Ono | |
| 2005/0089315 A1 * | 4/2005 | Imamura et al. ............ 386/127 |
| 2005/0209376 A1 | 9/2005 | Donelson | |
| 2005/0243156 A1 * | 11/2005 | Matsutomo ................. 347/136 |

FOREIGN PATENT DOCUMENTS

| | | |
|---|---|---|
| JP | 04-283772 | 10/1992 |
| JP | 04-366868 | 12/1992 |
| JP | 2000-263839 | 9/2000 |

OTHER PUBLICATIONS

Chinese Office Action dated Jul. 24, 2009.
European Office Action dated Sep. 1, 2009.

* cited by examiner

*Primary Examiner*—Negussie Worku
(74) *Attorney, Agent, or Firm*—Harness, Dickey & Pierce, PLC (57) ABSTRACT

An optical scanning unit of an image forming apparatus may include: an optical housing configured to include at least one optical part and to have a light-beam emitting aperture through which a light beam can emanate from the optical housing; a shutter configured to cover the light-beam emitting aperture; and a driving unit configured to drive the shutter to and fro, thus opening and closing the light-beam emitting aperture. Such a driving unit further can operate to coordinate at least one of the opening and the closing to occur after activation and before deactivation of a writing operation conducted by the optical scanning unit, respectively.

19 Claims, 5 Drawing Sheets

IMAGE PROCESSING APPARATUS HAVING ENHANCED CONTROLLING PROCESS FOR OPTICAL SCANNING UNIT

PRIORITY STATEMENT

This application claims the priority under 35 U.S.C. §119 upon Japanese Patent Application No. 2005-346035, filed on Nov. 30, 2005, the disclosure of which is incorporated herein in its entirety by reference.

BACKGROUND

In a market of image forming apparatus such as laser printer and digital copier, an increased demand is voiced in many features of image forming apparatus such as enhanced image quality, enhanced image-forming speed, further miniaturization of apparatus, and enhanced energy saving, for example.

In view of such trend, an optical writing unit has been employing optical parts having a higher quality and higher performance. Such optical part may include a light source, which irradiates a light beam to an image-carrying member, for example.

In some image forming apparatuses, an optical scanning unit having a light-beam emitting aperture may be disposed under the photosensitive unit.

In such image forming apparatus, when toners spill over or scatter from a photosensitive unit, developing unit, and cleaning unit, such spilled toners may intrude into the optical scanning unit through the light-beam emitting aperture.

Accordingly, the light-beam emitting aperture may be covered with a transparent dustproof member such as glass plate to prevent an intrusion of foreign materials (e.g., toner) into the optical scanning unit through the light-beam emitting aperture.

Such configuration may prevent an intrusion of foreign materials into the optical scanning unit, but foreign materials (e.g., toner) may adhere on the dustproof glass, which may lead to a degradation of image quality.

In related image forming apparatus, an optical scanning unit may include a shutter over a transparent member (e.g., dustproof glass) so that the transparent member may not be contaminated with foreign materials (e.g., toner).

Such shutter may block toner adhesion to the transparent member (e.g., dustproof glass), which may be effective for preventing contamination of dustproof glass.

In one related art, such shutter may be in an opened-condition before starting a developing process for a latent image on the photosensitive unit, and the shutter may be closed just before a completion of the developing process on the photosensitive unit.

In another related art, such shutter may be set to an opened-condition when a given time has lapsed after a synchronous-detecting marking on a photosensitive unit is detected, and the shutter may becomes into a closed-condition when a given time has lapsed after a writing operation in a sub-scanning direction has completed.

However, if the shutter is closed before completing the developing process on the photosensitive member (i.e., the shutter is closed at a wrong timing), a latent image may not be correctly developed on the photosensitive member.

Furthermore, if the shutter becomes into a closed-condition when a given time has lapsed after a writing operation in a sub-scanning direction has completed, the shutter may be in an opened-condition for a time period between a completion of writing operation and a complete closing of the shutter.

In such cases, foreign materials (e.g., toner), dropped by unexpected external shock, may contaminate optical parts related to light beam transmission of the optical scanning unit such as dustproof glass via the above-mentioned still-opened shutter.

SUMMARY

At least one embodiment of the present invention relates to an optical scanning unit of an image forming apparatus. Such an optical scanning unit may include: an optical housing configured to include at least one optical part and to have a light-beam emitting aperture through which a light beam can emanate from the optical housing; a shutter configured to cover the light-beam emitting aperture; and a driving unit configured to drive the shutter to and fro, thus opening and closing the light-beam emitting aperture. Such a driving unit is further operable to coordinate at least one of the opening and the closing to occur after activation and before deactivation of a writing operation conducted by the optical scanning unit, respectively.

Additional features and advantages of the present invention will be more fully apparent from the following detailed description of example embodiments, the accompanying drawings and the associated claims.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on," "against," "connected to" or "coupled to" another element or layer, then it can be directly on, against connected or coupled to the other element or layer, or intervening elements or layers may be present. In contrast, if an element is referred to as being "directly on", "directly connected to" or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 1:
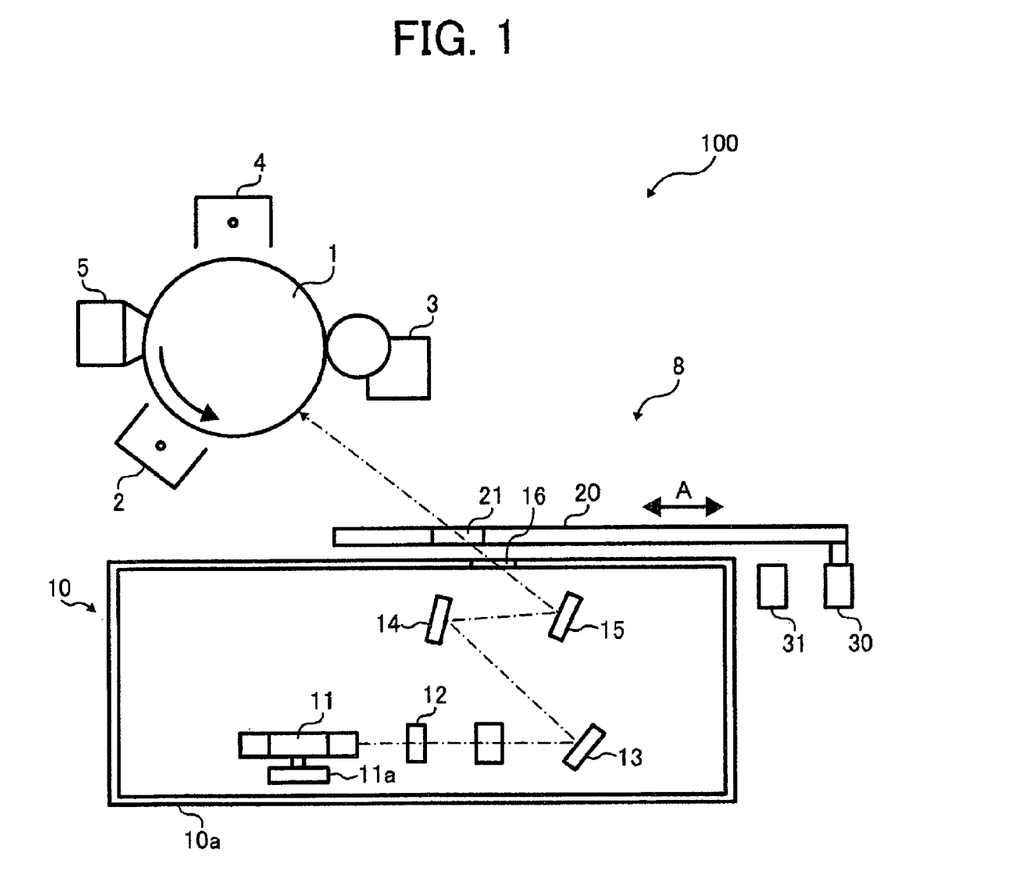
FIG. 1 is a schematic view an image forming apparatus according to an example embodiment of the present invention.

Referring now to the drawings, wherein like reference numerals designate identical or corresponding parts throughout the several views, an image forming apparatus according to an example embodiment of the present invention is described with particular reference to FIG. 1.

FIG. 1 is a schematic view of an image forming apparatus 100 according to an example embodiment.

As shown in FIG. 1, the image forming apparatus 100 may include a photosensitive member 1, a charger 2, a developing unit 3, a transfer unit 4, a cleaning unit 5, and an optical scanning unit 8, for example. The optical scanning unit 8 may include an optical writing unit 10, a shutter 20, sensors 30 & 31 and a driving unit (not depicted in FIG. 1 but see FIGS. 2, 3, and 4), for example.

The photosensitive member 1 may rotate in a counter-clockwise direction in FIG. 1 by a driver (not shown), for example.

The charger 2 uniformly charges a surface of the photosensitive member 1 when the photosensitive member 1 is rotating.

Then, a light beam, emanating from a housing 10a of the optical writing unit 10 irradiates the charged surface of the photosensitive member 1 so that an electrostatic latent image is formed on the photosensitive member 1.

The developing unit 3 develops the electrostatic latent image on the photosensitive member 1 as toner image.

The transfer unit 4 transfers the toner image from the photosensitive member 1 to a transfer sheet (not shown). The transfer sheet can be transported from a sheet feed unit (not shown) to the photosensitive member 1 by a sheet transporter. The sheet transporter may have a sheet transporter guide plate to align the transfer sheet in a correct orientation.

After transferring the toner image to the transfer sheet from the photosensitive member 1, a fixing unit (not shown) fixes the toner image on the transfer sheet, and then the transfer sheet is ejected from the image forming apparatus 100.

After transferring the toner image to the transfer sheet from the photosensitive member 1, the cleaning unit 5 removes toner particles remaining on the photosensitive member 1.

In the optical writing unit 10, a light beam emitted from a light source (not shown), e.g., such as semiconductor laser goes through a collimator lens, a spherical lens, and a cylindrical lens, and enters a polygon mirror 11. The polygon mirror 11 may be rotated by a polygon motor 11a.

The light beam deflected by the polygon mirror 11 goes through a f-theta lenses 12, and reflects at mirrors 13, 14, and 15, and passes through a slit 16. The slit 16 may be used as light-beam emitting aperture through which the light beam can emanate from the housing 10a.

Then, the light beam goes to the photosensitive member 1, and scans a surface of photosensitive member 1 in an axial direction (or main scanning direction) of the photosensitive member 1.

In general, a transparent member, e.g., such as dustproof glass may cover the slit 16 to reduce if not prevent an intrusion of foreign materials (e.g., toner) into the optical writing unit 10.

As shown in FIG. 1, a shutter 20 is provided between the optical writing unit 10 and photosensitive member 1. The shutter 20 may be formed into a plate shape, for example.

In an example embodiment, the shutter 20 may include an opening 21 as shown in FIG. 1.

When the opening 21 and slit 16 are aligned in a light beam direction, the shutter 20 may be in an opened-condition, and when the opening 21 and slit 16 are not aligned in a light beam direction, the shutter 20 may be in a closed-condition.

Sensors 30 and 31 shown in FIG. 1 may be used to detect an opening and closing of the shutter 20.

As shown in FIG. 1, the shutter 20 may be slidably moved in a direction shown by an arrow A by a driving unit (see FIGS. 2, 3, and 4) so that the shutter 20 can be set to an opened or closed-condition.

Figure 2:
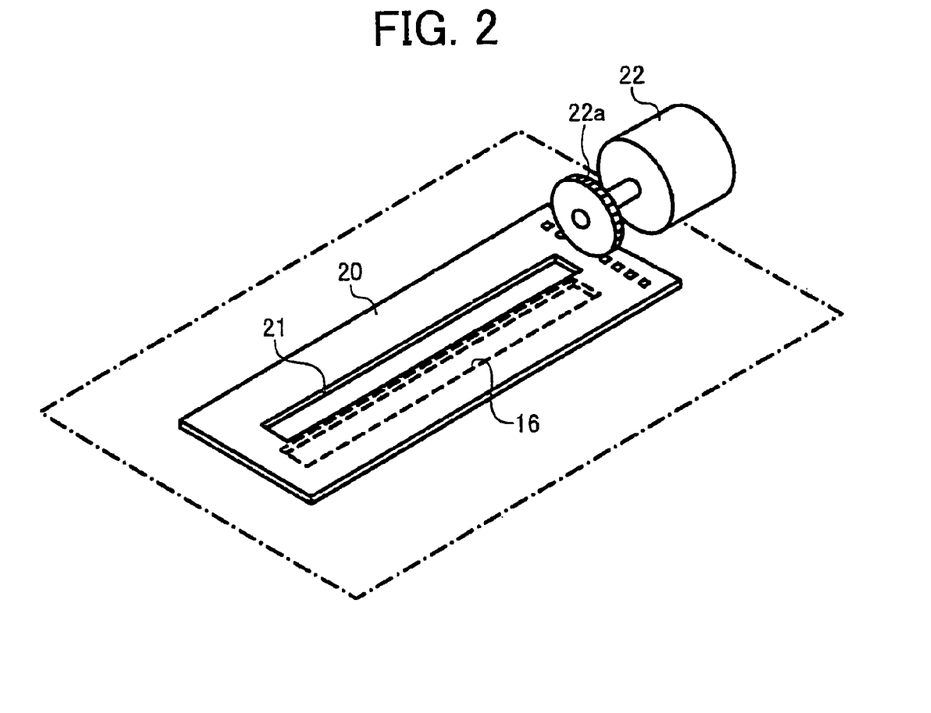
FIGS. 2, 3, and 4 are perspective views of example shutter-driving units for use in an image forming apparatus of FIG. 1 according to example embodiments of the present invention, respectively.
Figure 3:
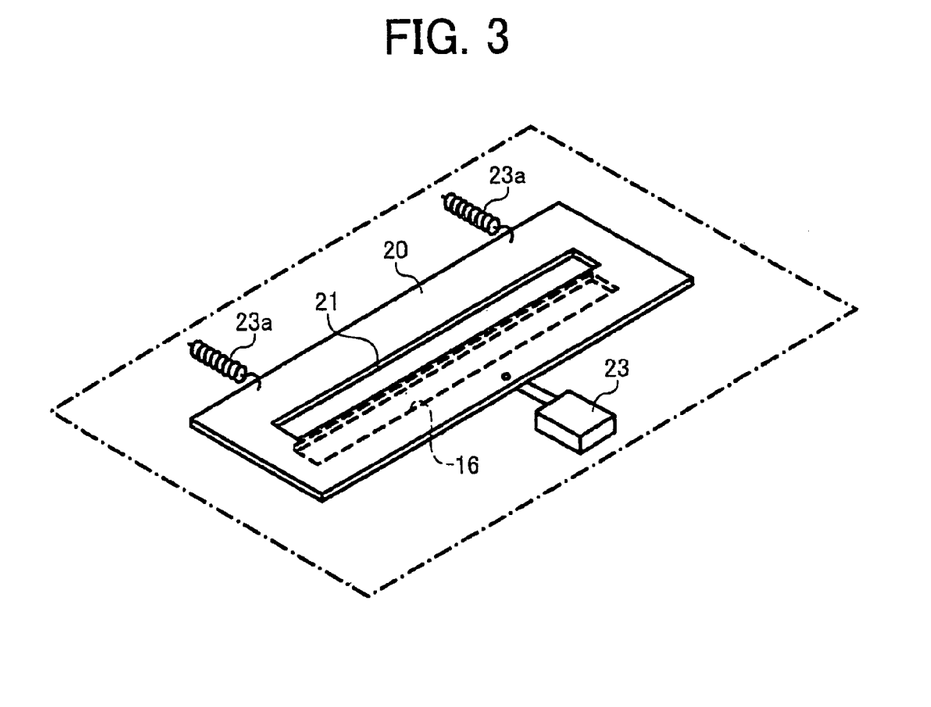
Figure 4:
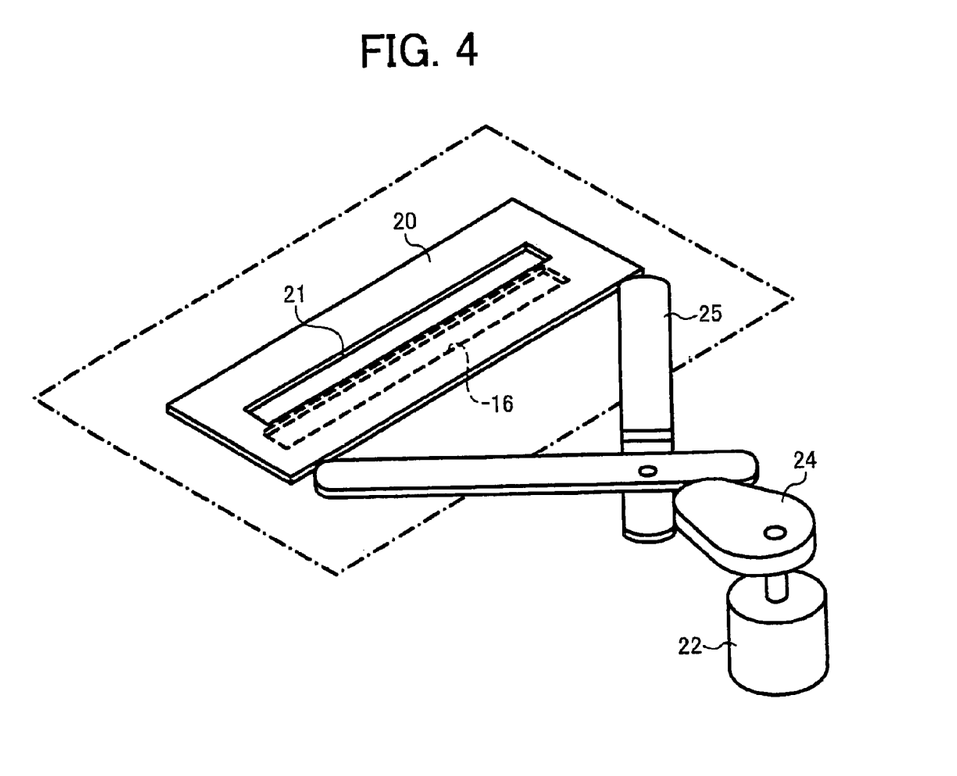

The driving unit for the shutter 20 may include several types as shown in FIGS. 2 to 4 according to example embodiments of the present invention, respectively.

Specifically, one driving unit shown in FIG. 2 includes a motor 22 attached with a gear 22a. The gear 22a may engage with ditches on the shutter 20 as shown in FIG. 2. The shutter 20 can be moved in one direction when the motor 22 drives the gear 22a, engaged with the ditches of the shutter 20, in one rotational direction.

Furthermore, another driving unit shown in FIG. 3 includes a solenoid 23 and a spring 23a to move the shutter 20.

Furthermore, another driving unit shown in FIG. 4 includes the motor 22, a cam 24, and a lever 25. The motor 22 rotates the cam 24, and the cam 24 moves the lever 25 to move the shutter 20.

Although not shown, the shutter 20 may be moved in a pivotable manner to open or close the slit 16 instead of sliding the shutter 20 in one direction. In such pivotable configuration, the shutter 20 may be connected a pivotable arm (not shown), driven by a motor.

If the optical writing unit 10 has a plurality of slits 16 to emit a plurality of light beams, a plurality of shutters 20 may be separately provided for the plurality of slits 16.

However, a plurality of slits 16 may be opened or closed by one shutter as below explained.

For example, if the optical writing unit 10 has a plurality of slits 16, the shutter 20 (i.e., one shutter) may have a plurality of openings 21 corresponding to the plurality of slits 16.

In such configuration, the shutter 20 may open or close the plurality of openings 21 simultaneously when a driving unit (e.g., driving unit of FIGS. 2 to 4) drives the shutter 20.

Hereinafter, a process for opening or closing of the shutter 20 is explained with reference to FIGS. 5 and 6.

Figure 5:
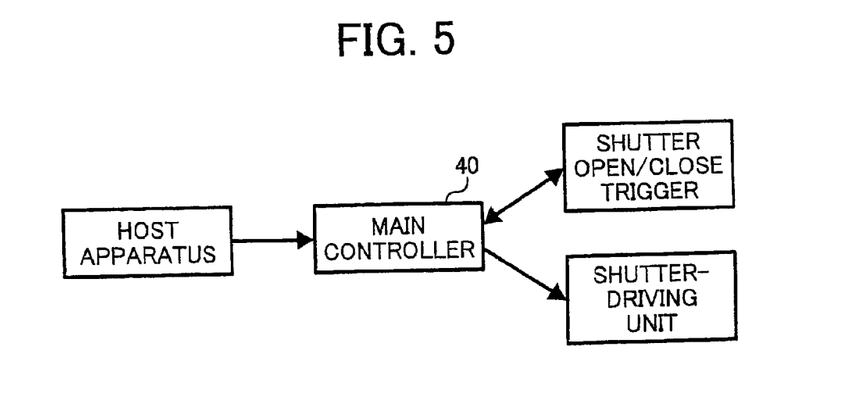
FIG. 5 is a block diagram for controlling a shutter-driving unit according to an example embodiment of the present invention.

FIG. 5 shows a main controller 40 for controlling the shutter 20 according to an example embodiment of the present invention. FIG. 6 is a flowchart for explaining a process (according to an example embodiment of the present invention) of controlling a shutter-driving unit.

Figure 6:
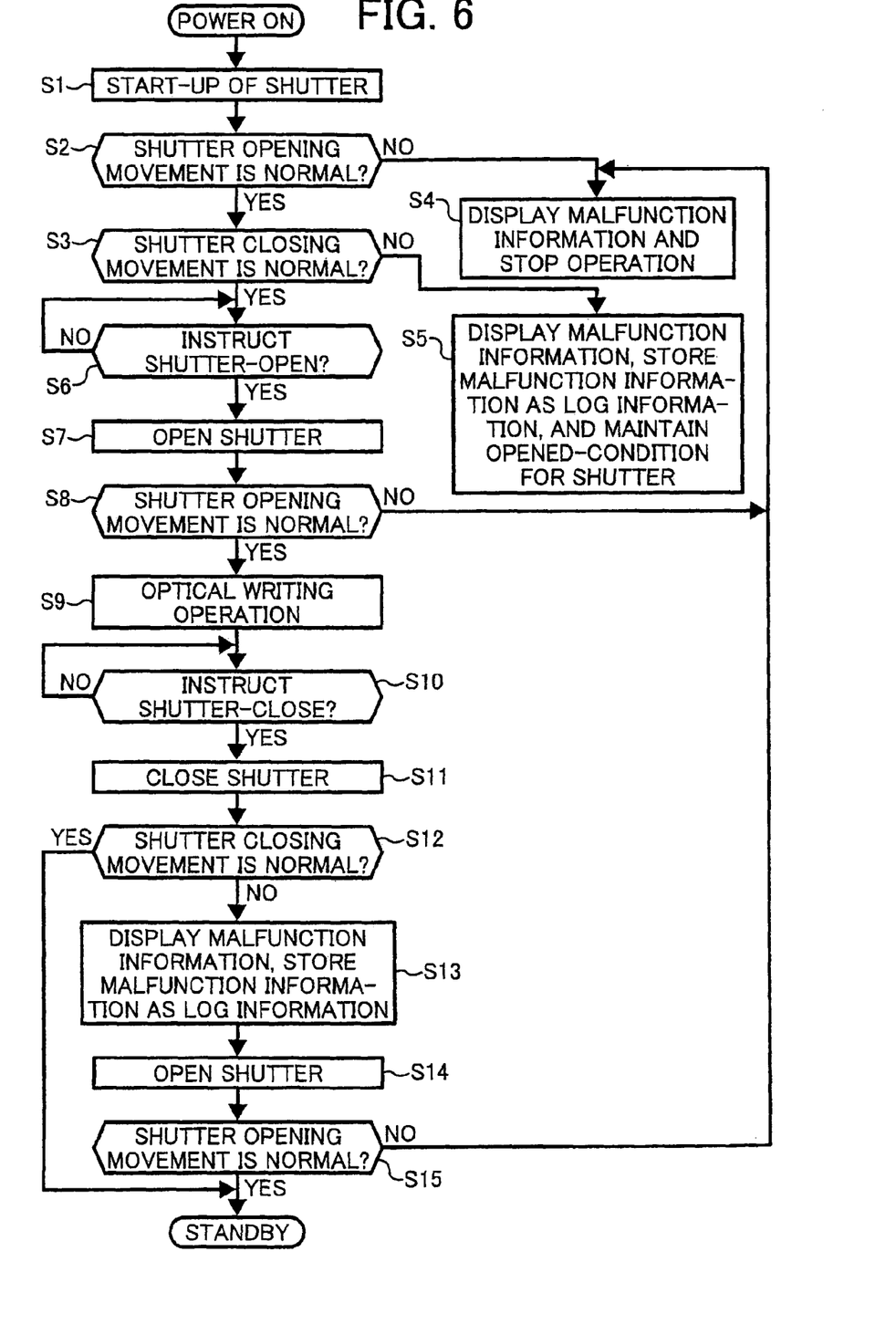
FIG. 6 is a flowchart for explaining a process (according to an example embodiment of the present invention) of controlling a shutter-driving unit.

In FIG. 6, the image forming apparatus 100 is activated at first. For example, the image forming apparatus 100 may be supplied with power from a power source, by which the image forming apparatus 100 may be set to a power-ON condition.

At step S1, the main controller 40 instructs a start-up process, e.g., such as start-up opening or closing movement of shutter and other warming-up process, as required.

At step S2, the main controller 40 checks whether the shutter 20 is in a normal opening movement with the sensors 30 and 31.

If the main controller 40 confirms that the shutter 20 is in a normal opening movement at step S2, the main controller 40 checks whether the shutter 20 is in normal closing movement with the sensors 30 and 31 at step S3.

If the main controller 40 confirms that the shutter 20 is not in a normal opening movement at step S2, the main controller 40 displays shutter-malfunction information on an operation panel, and stops an operation of the image forming apparatus 100 at step S4.

If the main controller 40 confirms that the shutter 20 is not in a normal closing movement at step S3, the main controller 40 displays shutter-malfunction information on the operation panel, and the main controller 40 stores such malfunction condition as log information in the image forming apparatus 100, and maintains an opened-condition for shutter 20 at step S5.

Although the shutter 20 may not be closed in a normal manner at step S5, the shutter 20 may be maintained in an opened-condition to maintain the image forming apparatus 100 at an operable condition.

Specifically, the image forming apparatus 100 may be operable because the shutter 20 is in an opened-condition (i.e., a light beam can pass through the opening 21 and slit 16).

By operating the image forming apparatus 100 under such condition, a downtime of the image forming apparatus 100 may be reduced or substantially eliminated.

Because the shutter 20 may not be closed in a normal manner, the shutter 20 may need to be repaired at a given time so that image quality may not be degraded due to the shutter 20, which may not be closed. Such image quality degradation may be observed as unnecessary line images on a printed image, for example.

The shutter 20 may be repaired when a user does not use the image forming apparatus 100, for example.

If the main controller 40 confirms that the shutter 20 is in the normal closing movement at step S3, the shutter 20 is in a normal condition for opening and closing movement.

During such process, the optical writing unit 10 may be in a standby condition, in which the optical writing unit 10 is waiting a writing instruction.

If the writing instruction is issued, the main controller 40 instructs an opening of the shutter 20 at step S6, and an opening of the shutter 20 is activated at step S7.

At step S8, the main controller 4Q checks whether the shutter 20 is in a normal opening movement.

If the main controller 40 confirms that the shutter 20 is in the normal opening movement at step S8, the shutter 20 is opened and the sensors 30 and 31 become ON-condition. In other words, the sensors 30 and 31 may detect that the shutter 20 is opened.

Then, at step S9, the optical writing unit 10 conducts an optical writing operation.

If the main controller 40 confirms that the shutter 20 is not in the normal opening movement at step S8, the shutter 20 may not in an opened-conditioned, and the sensors 30 and 31 may not become ON-condition. In other words, the sensors 30 and 31 may not detect that the shutter 20 is opened.

Then, the process goes back to step S4, at which the main controller 40 displays shutter-malfunction information on the operation panel, and stops an operation of the image forming apparatus 100.

When the optical writing unit 10 completes the optical writing at step S9, the main controller 40 checks whether a close-instruction of the shutter 20 is issued at step S10.

If the main controller 40 confirms that the close-instruction of the shutter 20 is issued at step S10, the main controller 40 instructs a closing movement of the shutter 20 at step S11.

Then, at step S12, the main controller 40 checks whether the shutter 20 is in a normal closing movement.

If the main controller 40 confirms that the shutter 20 is in the normal closing movement at step S12, the optical writing unit 10 may be set to a standby condition, in which the optical writing unit 10 may wait for a next writing instruction.

If the main controller 40 confirms that the shutter 20 is not in the normal closing movement at step S12, the main controller 40 displays shutter-malfunction information on the operation panel, and stores such malfunction condition as log information in the image forming apparatus 100 at step S113.

Then, the main controller 40 opens the shutter 20 at step S14.

At step S15, the CPU checks whether the shutter 20 is in a normal opening movement.

If the main controller 40 confirms that the shutter 20 is in the normal opening movement at step S15, the optical writing unit 10 may be set to a standby condition, in which the optical writing unit 10 may wait for a next writing instruction.

If the main controller 40 confirms that the shutter 20 is not in the normal opening movement at step S15, the process goes back to step S4, and the main controller 40 displays shutter-malfunction information on the operation panel, and stops an operation of the image forming apparatus 100 at step S4.

Toners are more likely to spill over or scatter from a toner-related unit such as photosensitive member and developing member when such toner-related unit is activated or deactivated compared to a continuous operating period of the toner-related unit.

Therefore, in at least one example embodiment according to the present invention, an opening and closing timing of the shutter 20 may be synchronized with a writing operation timing of the optical writing unit 10.

Specifically, a light-beam ON signal of the optical writing unit 10 may trigger the open-instruction of the shutter 20 at step S6. The light-beam ON signal may be a signal generated when a light source of the optical writing unit 10 starts to emit a light beam.

Furthermore, a polygon-motor ON signal may also trigger the open-instruction of the shutter 20 at step S6. The polygon-motor ON signal may be a signal generated when the polygon motor 11a is activated.

Similarly, a light-beam OFF signal of the optical writing unit 10 may trigger the close-instruction of the shutter 20 at step S10. The light-beam OFF signal may be a signal generated when the light source of the optical writing unit 10 stops emitting the light beam.

Furthermore, a polygon-motor OFF signal may trigger the close-instruction of the shutter 20 at step S10. The polygon-motor OFF signal may be a signal generated when the polygon motor 11a is deactivated.

As such, the opening and closing of the shutter 20 may be triggered by the light beam ON/OFF signal or polygon motor ON/OFF signal, for example.

As above-mentioned, the image forming apparatus 100 may include several units related to image forming operation such as photosensitive member 1 and developing unit 3, for example.

In general, the photosensitive member 1 or developing unit 3 may use toner particles because of their functions. Therefore, toner particles may drop from the photosensitive member 1 or developing unit 3 when the photosensitive member 1 or developing unit 3 is activated for image forming operation or deactivated after image forming operation.

For example, if the shutter 20 is opened before the photosensitive member 1 or developing unit 3 is activated, toner particles, dropped from the photosensitive member 1 or developing unit 3, may undesirably contaminate a dustproof glass of the slit 16, and similarly, if the shutter 20 is closed after the photosensitive member 1 or developing unit 3 is deactivated, toner particles, dropped from the photosensitive member 1 or developing unit 3, may undesirably contaminate the dustproof glass of the slit 16.

In view of such background, the light-beam ON signal or polygon-motor ON signal may be generated after the photosensitive member 1 or developing unit 3 is activated, and such light-beam ON signal or polygon-motor ON signal may be used as a trigger signal for opening the shutter 20. In such configuration, the shutter 20 may be opened after the photosensitive member 1 or developing unit 3 is activated, by which a contamination of the dustproof glass of the slit 16 by dropping toner particles may be suppressed.

Furthermore, the light-beam OFF signal or polygon-motor OFF signal may be generated before the photosensitive member 1 or developing unit 3 is deactivated, and such light-beam OFF signal or polygon-motor OFF signal may be used as a trigger signal for closing the shutter 20. In such configuration, the shutter 20 may be closed before the photosensitive member 1 or developing unit 3 is deactivated, by which a contamination of the dustproof glass of the slit 16 by dropping toner particles may be suppressed.

Accordingly, setting and using the light beam ON/OFF signal or polygon motor ON/OFF signal as trigger signal for opening or closing the shutter 20 in the above-explained manner may suppress a contamination of the dustproof glass of the slit 16.

The open-instruction of the shutter 20 at the step S6 may be triggered by signals transmitted from a sensor (e.g., ON/OFF signal) or an operation start signal to be generated in a controller, e.g., such as main controller 40. Specifically, such operation start signal may be generated as software instruction for the main controller 40, for example. The operation start signal may instruct an activation of the optical writing unit 10, for example.

Compared to signals transmitted from a sensor or the like, which may be more likely affected by electronic noises from environment, such software instruction may be less likely affected by electronic noises from environment.

Accordingly, if such software instruction may be used as trigger signal for opening the shutter 20, the opening of the shutter 20 may be conducted in a stable manner.

Furthermore, the image forming apparatus 100 may conduct a preliminary operation for checking a writing position by the optical writing unit 10 with a light beam before conducting an actual image forming.

A signal, which detects such preliminary operation, may be used as a trigger signal, by which a condition of the shutter 20 may be changed from closed-condition to opened-condition.

As above-mentioned, toners may more likely to spill over or scatter when unexpected shock occurs to the image forming apparatus 100.

Specifically, such unexpected shock may likely occur when a cover, a sheet transporter guide plate or the like of the image forming apparatus 100 is opened or closed for reasons such as sheet-jamming correction and maintenance work, for example.

Figure 7:
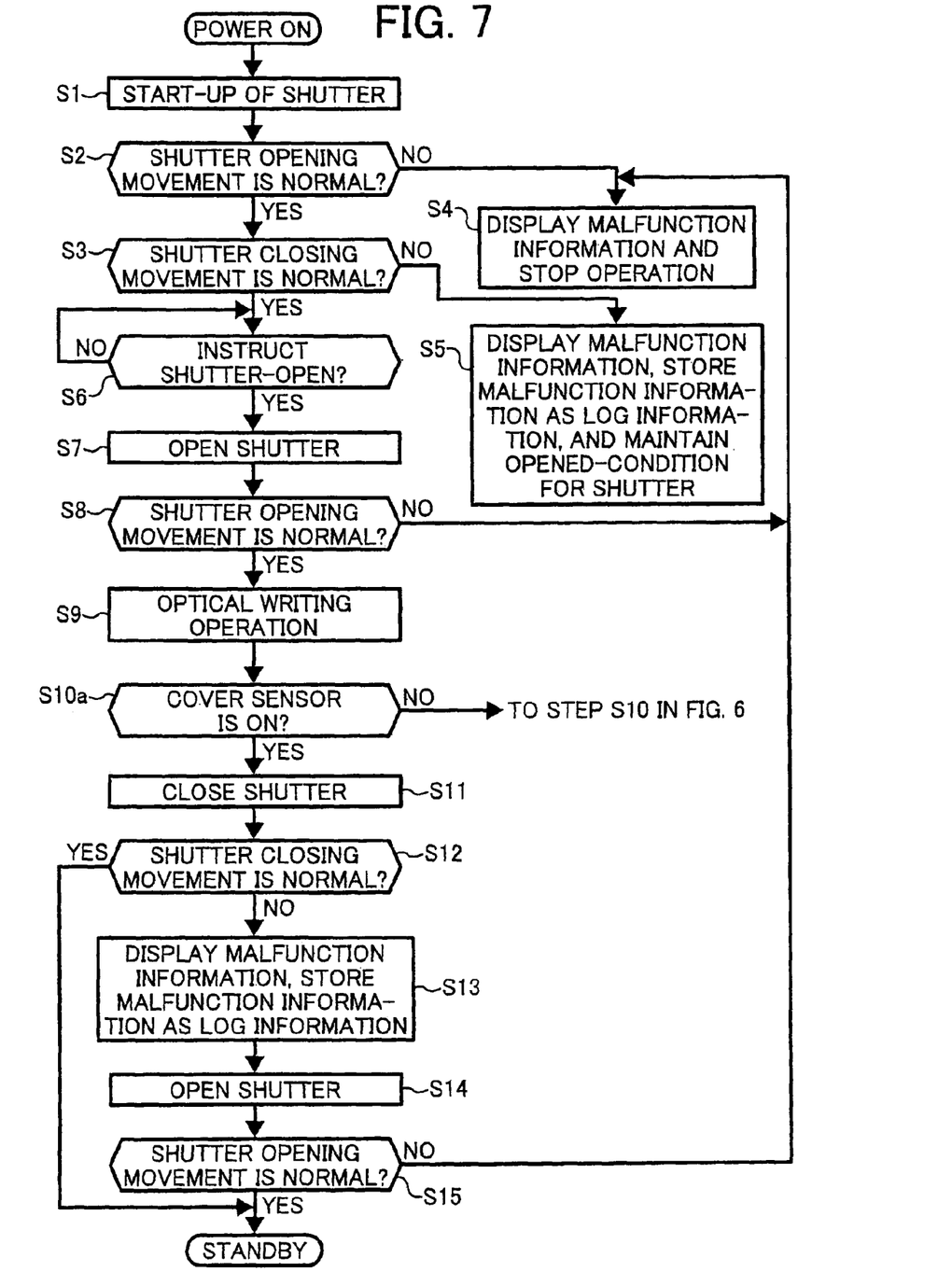
FIG. 7 is a flowchart for explaining another process (according to an example embodiment of the present invention) of controlling a shutter-driving unit.

In view of such unexpected shock, which may occur to the image forming apparatus 100, an opening and closing process (according to an example embodiment of the present invention) of the shutter 20 may be conducted with a flowchart shown in FIG. 7.

The flowchart shown in FIG. 7 has similar steps shown in FIG. 6 such as steps S1 to S9 and steps S11 to S15, and the explanation for such steps are omitted from the following explanation.

As shown in FIG. 7, at step S10a, the main controller 40 checks whether a cover sensor becomes ON condition. When the cover sensor is ON condition, a cover of the image forming apparatus 100 may be opened. The cover may include any kinds cover or the like such as outer cover, sheet transporter guide plate, for example.

If the main controller 40 confirms that the cover sensor is ON condition at step S10a, the main controller 40 advances the process to steps S11 to S15 as similar to FIG. 6.

If the main controller 40 confirms that the cover sensor is not ON condition at step S10a (i.e., no cover is opened), the main controller 40 advances the process to step S10 in FIG. 6. After the step S10, the main controller 40 advances the process to steps S11 to S15.

As such, when the shutter 20 is in an opened-condition, the cover sensor may be in ON condition. Then the shutter 20 is closed with the process shown in FIG. 7.

Accordingly, foreign materials (e.g., toner) may not contaminate optical parts (e.g., dustproof glass) of the optical writing unit 10 even if a shock or vibration may occur to the image forming apparatus 100 by opening the cover for some reasons such as jammed-sheet removal and maintenance work, for example.

In the above-described embodiment, malfunction information may be related to a malfunction of shutter and shutter-related parts for driving the shutter. However, malfunction information may also be related to other parts, which is not related to the shutter and shutter-related parts.

Accordingly, a process of opening and closing the shutter, which includes malfunctioned condition of other parts, may be conducted in a similar manner as to the above-described process explained with FIG. 7, as required.

Numerous additional modifications and variations are possible in light of the above teachings. It is therefore to be understood that within the scope of the appended claims, the disclosure of the present invention may be practiced otherwise than as specifically described herein.

What is claimed is:

1. An optical scanning unit of an image forming apparatus, the optical scanning unit comprising:
    an optical housing configured to include at least one optical part and to have a light-beam emitting aperture through which a light beam can emanate from the optical housing;
    a shutter configured to cover the light-beam emitting aperture; and
    a driving unit configured to drive the shutter to open and close the light-beam emitting aperture,
    the driving unit being operable to coordinate at least one of the opening and the closing of the light-beam emitting aperture to occur after activation and before deactivation of a writing operation conducted by the optical scanning unit, respectively, and
    the shutter from a closed-condition being opened by a first trigger signal including at least one of a light-beam ON signal of the optical scanning unit and a polygon-motor ON signal of the optical scanning unit.

2. The optical scanning unit according to claim 1, wherein the shutter in opened-condition is closed by using a second trigger signal including at least one of the following:
    a light-beam OFF signal of the optical scanning unit; and
    a polygon-motor OFF signal of the optical scanning unit.

3. The optical scanning unit according to claim 1, wherein the first trigger signal, further includes at least one of the following:
    a signal generated when checking a writing position by the optical scanning unit; and
    a signal generated by software to start operation of the optical scanning unit.

4. The optical scanning unit according to claim 1, wherein the shutter is closed when a malfunction of a first type part in the image forming apparatus is detected, and wherein the first type part includes a part which is not related for configuring and driving the shutter.

5. The optical scanning unit according to claim 4, wherein the shutter is closed when a malfunction occurs to a sheet transporter of the image forming apparatus, and wherein the sheet transporter is included in the first type part.

6. The optical scanning unit according to claim 4, wherein the shutter is closed when an opening of any one of a cover and sheet transporter guide plate of the image forming is detected, and wherein the cover and a sheet transporter guide plate are included in the first type part.

7. The optical scanning unit according to claim 1, wherein the shutter is opened when a malfunction of a second type part in the image forming apparatus is detected, and wherein the second type part includes the shutter and a part, which is related for configuring and driving the shutter.

8. The optical scanning unit according to claim 7, wherein the image forming apparatus displays malfunction information of the second type part on an operation unit when the malfunction of the second type part is detected and the shutter is opened.

9. The optical scanning unit according to claim 7, wherein the image forming apparatus stores malfunction information of the second type part as log information when the malfunction of the second type part is detected and the shutter is opened.

10. A method of operating an optical scanning unit of an image forming apparatus, the optical scanning unit including an optical housing configured to include at least one optical part and to have a light-beam emitting aperture through which a light beam can emanate from the optical housing, a shutter to cover the light-beam emitting aperture and a driving unit configured to drive the shutter, the method comprising:
    controlling the driving unit to drive the shutter to open and close the light-beam emitting aperture;
    coordinating at least one of the opening and the closing of the light-beam emitting aperture to occur after activation and before deactivation of a writing operation conducted by the optical scanning unit, respectively; and,
    using, as a trigger signal to cause opening of the shutter when upon the shutter being in a closed-condition, at least one of the following,
    a light-beam ON signal of the optical scanning unit, and
    a polygon-motor ON signal of the optical scanning unit.

11. The method according to claim 10,
    wherein the trigger signal to cause opening of the shutter further includes at least one of the following,
    a signal generated when checking a writing position by the optical scanning unit, and
    a signal generated by software to start operation of the optical scanning unit.

12. The method according to claim 11, further comprising:
    using, as a trigger signal to cause closing of the shutter when the same is in an opened-condition, at least one of the following,
    a light-beam OFF signal of the optical scanning unit, and
    a polygon-motor OFF signal of the optical scanning unit.

13. The method according to claim 10, further comprising:
    closing the shutter when a malfunction of a first type part in the image forming apparatus is detected, and wherein the first type part includes a part which is not related for configuring and driving the shutter.

14. The method according to claim 13, wherein the first type part is a sheet transporter.

15. The method according to claim 13, wherein:
    the first type part includes at least one of a cover and a sheet transporter guide plate; and
    the malfunction includes opening at least one of the cover and the sheet transporter guide plate, respectively.

16. The method according to claim 10, further comprising:
    opening the shutter when a malfunction of a second type part in the image forming apparatus is detected, and wherein the second type part includes the shutter and a part which is related for configuring and driving the shutter.

17. The method according to claim 16, further comprising:
    storing malfunction information of the second type part as log information when the malfunction of the second type part is detected and the shutter is opened.

18. The method according to claim 16, further comprising:
    displaying malfunction information of the second type part on an operation unit when the malfunction of the second type part is detected and the shutter is opened.

19. An imaging apparatus comprising:
    a photosensitive member;
    a charger to uniformly charge a surface of the photosensitive member;
    an optical scanning unit to provide a light beam impingent upon the charged surface of the photosensitive member resulting in an electrostatic latent image being formed thereon, the optical scanning unit including the following, an optical housing configured to include at least one optical part and to have a light-beam emitting aperture through which the light beam can emanate from the optical housing, a shutter configured to cover the light-beam emitting aperture, a driving unit configured to drive the shutter to open and close the light-beam emitting aperture, the driving unit being operable to coordinate at least one of the opening and the closing of the light-beam emitting aperture to occur after activation and before deactivation of a writing operation conducted by the optical scanning unit, respectively, and the shutter from a closed-condition being opened by a trigger signal including at least one of a light-beam ON signal of the optical scanning unit and a polygon-motor ON signal of the optical scanning unit;

a developing unit to develop the electrostatic latent image as a toner image on the photosensitive member; and a transfer unit to transfer the toner image from the photosensitive member to a transfer sheet.

* * * * *